US012736201B2

(12) United States Patent
Kvifte et al.

(10) Patent No.: US 12,736,201 B2
(45) Date of Patent: Sep. 15, 2026

(54) LED GROW LIGHT SYSTEM AND METHOD

(71) Applicants: Halvor Kvifte, Vinterbro (NO); Simen Sjolie, Vinterbro (NO); Bjorn William Omholt, Vinterbro (NO)

(72) Inventors: Halvor Kvifte, Vinterbro (NO); Simen Sjolie, Vinterbro (NO); Bjorn William Omholt, Vinterbro (NO)

( * ) Notice: Subject to any disclaimer, the term of this patent is extended or adjusted under 35 U.S.C. 154(b) by 0 days.

(21) Appl. No.: 19/175,286

(22) Filed: Apr. 10, 2025

(65) Prior Publication Data

US 2025/0320982 A1 Oct. 16, 2025

Related U.S. Application Data

(60) Provisional application No. 63/632,863, filed on Apr. 11, 2024.

(51) Int. Cl.

| | |
|---|---|
| ***F21V 13/04*** | (2006.01) |
| ***A01G 7/04*** | (2006.01) |
| ***A01G 9/24*** | (2006.01) |
| ***F21V 3/00*** | (2015.01) |
| ***F21V 5/00*** | (2018.01) |
| ***F21V 15/01*** | (2006.01) |
| ***F21V 17/10*** | (2006.01) |
| ***F21Y 113/13*** | (2016.01) |
| ***F21Y 115/10*** | (2016.01) |

(52) U.S. Cl.

CPC .............. *F21V 13/04* (2013.01); *A01G 7/045* (2013.01); *A01G 9/249* (2019.05); *F21V 3/00* (2013.01); *F21V 5/004* (2013.01); *F21V 15/013* (2013.01); *F21V 17/105* (2013.01); *F21Y 2113/13* (2016.08); *F21Y 2115/10* (2016.08)

(58) Field of Classification Search

CPC .......... F21V 15/013; F21V 3/00; F21V 29/00; A01G 9/249; A01G 7/045

USPC ................ 362/231, 230, 227, 294, 800, 805

See application file for complete search history.

(56) References Cited

U.S. PATENT DOCUMENTS

| | | | | |
|---|---|---|---|---|
| 9,943,042 | B2 | 4/2018 | Thosteson et al. | |
| 11,032,976 | B1 | 6/2021 | Cai | |
| 11,076,536 | B2 * | 8/2021 | Lys | F21V 23/045 |
| 12,224,502 | B2 * | 2/2025 | He | H05K 1/0243 |
| 2007/0058368 | A1 * | 3/2007 | Partee | A01G 9/249 362/373 |
| 2012/0162986 | A1 * | 6/2012 | Mekhtarian | A01G 7/045 362/249.01 |
| 2017/0370570 | A1 * | 12/2017 | Keen | F21V 29/67 |

(Continued)

*Primary Examiner* — Edwyn Labaze

(74) *Attorney, Agent, or Firm* — MICHAEL BEST & FRIEDRICH LLP

(57) ABSTRACT

A system and method for providing artificial lighting for indoor plant growth features a grow light fixture with a flat aluminum printed circuit board (PCB) populated with at least two LED variants, such as red (620-660 nm) and blue (450-470 nm), housed in a metallic extrusion with a uniform cross-section. A transparent cover, made of acrylic or polycarbonate with a planar surface and two side lobes, snap-fits to the housing. The fixture includes a local, independently controllable power supply with a network connection—wired (e.g., Ethernet) or wireless (e.g., WiFi, Bluetooth)—enabling remote LED control. This design offers an efficient, cost-effective lighting solution for commercial greenhouses or vertical farms, with independently powered and controlled units.

16 Claims, 6 Drawing Sheets

(56) References Cited

U.S. PATENT DOCUMENTS

| | | | | |
|---|---|---|---|---|
| 2018/0261738 | A1* | 9/2018 | Cha | H10H 20/855 |
| 2019/0223386 | A1* | 7/2019 | Limpert | A01G 7/02 |
| 2021/0262651 | A1* | 8/2021 | Pahlevaninezhad | A01G 7/045 |
| 2022/0022381 | A1* | 1/2022 | Li | F21V 14/006 |
| 2024/0276622 | A1* | 8/2024 | Gaylor | A01G 9/249 |

* cited by examiner

1000

LED GROW LIGHT SYSTEM AND METHOD

CROSS-REFERENCE TO RELATED APPLICATIONS

This application claims priority to U.S. provisional patent application U.S. 63/632,863 filed on Apr. 11, 2024 entitled "LED Grow Light Assembly and Engine" the contents of which are hereby fully incorporated by reference.

BACKGROUND OF THE INVENTION

The invention relates to a light source for illuminating an indoor grow facility, and more particularly to a light source that utilizes multiple light emitting diodes (LEDs), including at least a red and a blue LED for illuminating an indoor grow facility.

LED lighting is highly effective for growing plants indoors. The LEDs are energy efficient compared to more traditional light sources such as fluorescent, incandescent bulbs or the high-pressure sodium and metal halide lamps often used in commercial crop cultivation. They can also be can be customized to emit specific wavelengths of light—such as red and blue—that are optimal for photosynthesis, promoting healthy growth and development. Red light encourages flowering and fruiting, while blue light supports vegetative growth like leaves and stems. LEDs produce very little heat compared to other grow lights, which means they can be placed closer to plants without risking damage from overheating. This also reduces the need for extra cooling systems. They're durable, with a long lifespan, so they don't need frequent replacement. Finally, their compact size makes them versatile for various indoor setups, from small home gardens to larger hydroponic systems. All these factors combined make LEDs a practical and efficient choice for indoor plant cultivation.

In practical terms, studies and grower reports suggest that LEDs use 40-70% less electricity than HIDs for equivalent yields. Against fluorescents, savings are typically 50-60%, and against incandescent lighting, it's closer to 80-90%.

In order to cheaply, easily and efficiently incorporate LED lighting into commercial greenhouses or vertical farms, there is need for LED lighting systems that incorporate network controllable power units can be flexibly integrated into the buildings.

Relevant prior art includes:

U.S. Pat. No. 11,032,976 issue on Jun. 15, 2021, to Dengke Cai entitled "Light fixture for indoor grow application and components thereof" that describes a light fixture that includes a housing, a controller, and a lighting module. The housing defines a first and second portions. The second portion defines a window. The controller is at least partially disposed within the first portion. The lighting module is at least partially disposed in the second portion. The lighting module includes a submount, a plurality of light emitting diodes, a lens cover, an encapsulating material, and a protective coating. The plurality of light emitting diodes is coupled with the submount and is configured to project light through the window. The lens cover includes an exterior surface and overlies the plurality of light emitting diodes and the submount such that the lens cover and the submount define an interior therebetween. The encapsulating material substantially fills the interior. The protective coating is provided over the exterior surface.

U.S. Pat. No. 9,943,042 issued on Apr. 17, 2018, Eric Thosteson et al. entitled "Grow light embodying power delivery and data communications features" that describes various embodiments relating to fixtures, systems and methods for providing vegetation grow light fixtures with auxiliary power and/or data communication ports or hubs allowing for expansion of their functionality, modularity and adaptability. The addition of power or communication ports integrated with a grow light fixture enables other components to be connected directly to and powered by the grow light fixture. Such components may include but are not limited to supplemental lighting, sensors and actuators.

Various implementations are known in the art, but fail to address all of the problems solved by the invention described herein. Various embodiments of this invention are illustrated in the accompanying drawings and will be described in more detail below.

SUMMARY OF THE INVENTION

Inventive systems and methods of providing and controlling artificial lighting for growing plants indoors are disclosed.

In one embodiment of the present invention a grow light fixture may include a flat aluminum printed circuit board (PCB) that may be populated with at least two variants of LEDs. The populated PCB may be situated in a metallic housing that may be shaped and sized to accommodate, or fit, it. There may also be a transparent cover having a planar surface with two side lobes situated at the edge of the planar surface and extending normal to the planar surface. The metallic housing may also be shaped so as to snap fit to the side lobes of transparent cover.

In a preferred embodiment, both the transparent cover and the metallic housing may be formed as extrusions each having a uniform cross-section. The metallic housing may be made of aluminum, while the transparent cover may be made of a suitable material having good visible light transmitting properties such as, but not limited to, an acrylic or a polycarbonate.

The PCB may be populated with LEDs having a variety of properties such as, but not limited to, red LEDs having a spectral output in a range of 620-660 nm, blue LEDs having a spectral output in a range of 450-470 nm, or some combination thereof.

The LED light fixture may also include a local, independently controllable power supply that may also include a network connection thereby enabling independent, automated, remote control of the LEDs. The network connection may, for instance, be a wired connection such as, but not limited to, an ethernet connection or a two-line differential signal communications channel, or it may be a wireless connection, such as, but not limited to, a WiFi, or a Bluetooth connection, or some combination thereof.

Therefore, the present invention succeeds in conferring the following, and others not mentioned, desirable and useful benefits and objectives.

It is an object of the present invention to provide an LED lighting system that may be cheaply, easily and efficiently incorporated into commercial greenhouses or vertical farms It is another object of the present invention to provide an LED lighting system in which units may be independently powered and automatically controlled.

DETAILED DESCRIPTION OF THE INVENTION

Figure 1:
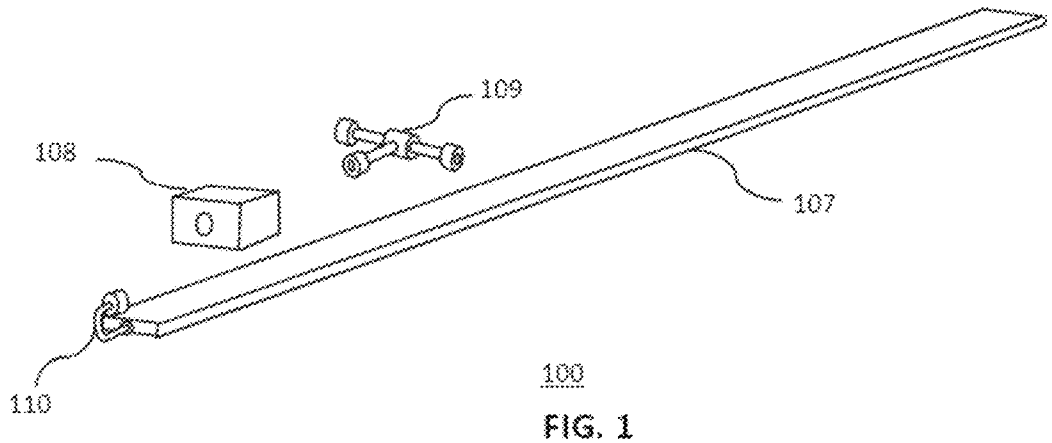
FIG. 1 shows a schematic, exploded view of representative components of an LED grow light fixture of the present invention.

The preferred embodiments of the present invention will now be described with reference to the drawings. Identical elements in the various figures are identified, in so far as possible, with the same reference numerals. The embodiments that are described in detail are provided by way of explanation of the present invention, which is not intended to be limited thereto. In fact, those of ordinary skill in the art may appreciate upon reading the present specification and viewing the present drawings that various modifications and variations can be made thereto.

FIG. 1 shows a schematic, exploded view 100 of representaive components of an LED grow light fixture of the present invention.

These components may include a metallic housing 107 that may contain a flat aluminum PCB (see FIGS. 3 and 4) that may be populated with a variety of LEDs. The metallic housing may, for instance, be made of a suitable material such as, but not limited to, extruded aluminum.

The components may also include a local power supply 108 that may be connected to the metallic housing via a local electrical connector 110. The local power supply may, in turn, be connected to other LED grow light fixtures and/or to a central power supply (see FIG. 2) by an electrical cross-connector 109. The electrical cross-connector may also include a wired communication channel such as, but not limited to, a two-line differential signal communications channel.

Figure 2:
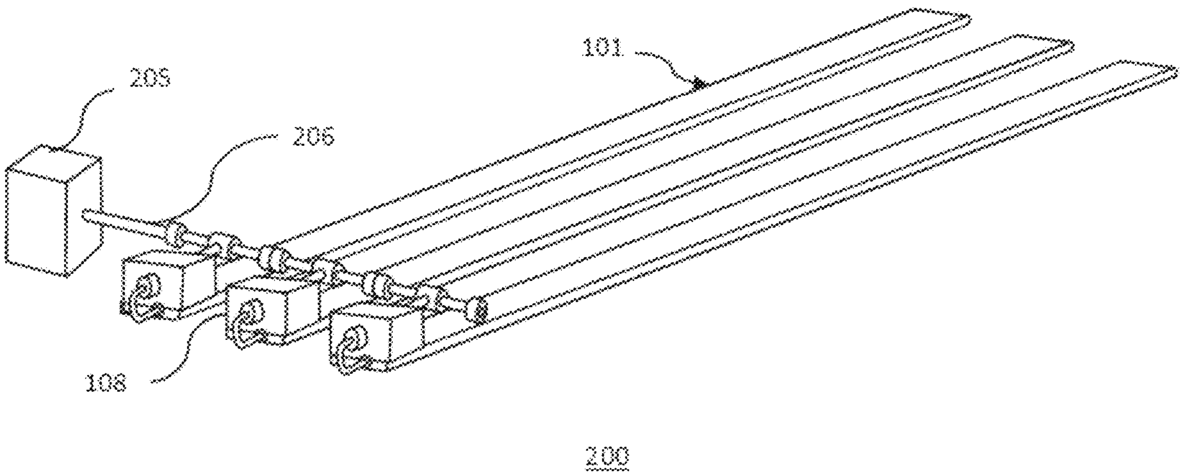
FIG. 2 shows a schematic, isometric rendering of representative components of three interconnected LED grow light fixtures of the present invention.

FIG. 2 shows a schematic, isometric rendering 200 of representative components of three interconnected LED grow light fixtures of the present invention.

As shown, each of the LED grow light fixtures 101 may have a local power supply 108 that may be connected to other LED grow light fixtures, or by a main electrical power connector 206 to a central power supply 205.

The local, independently controllable power supply may include a network connection that may enable independent, automated remote control of the LEDs on each of the LED grow light fixtures. The network connection may, for instance, be a wired connection such as, but not limited to, an ethernet connection or a two-line differential signal communications channel, or it may be a wireless connection, such as, but not limited to, a WiFi, or a Bluetooth connection, or some combination thereof.

Figure 3:
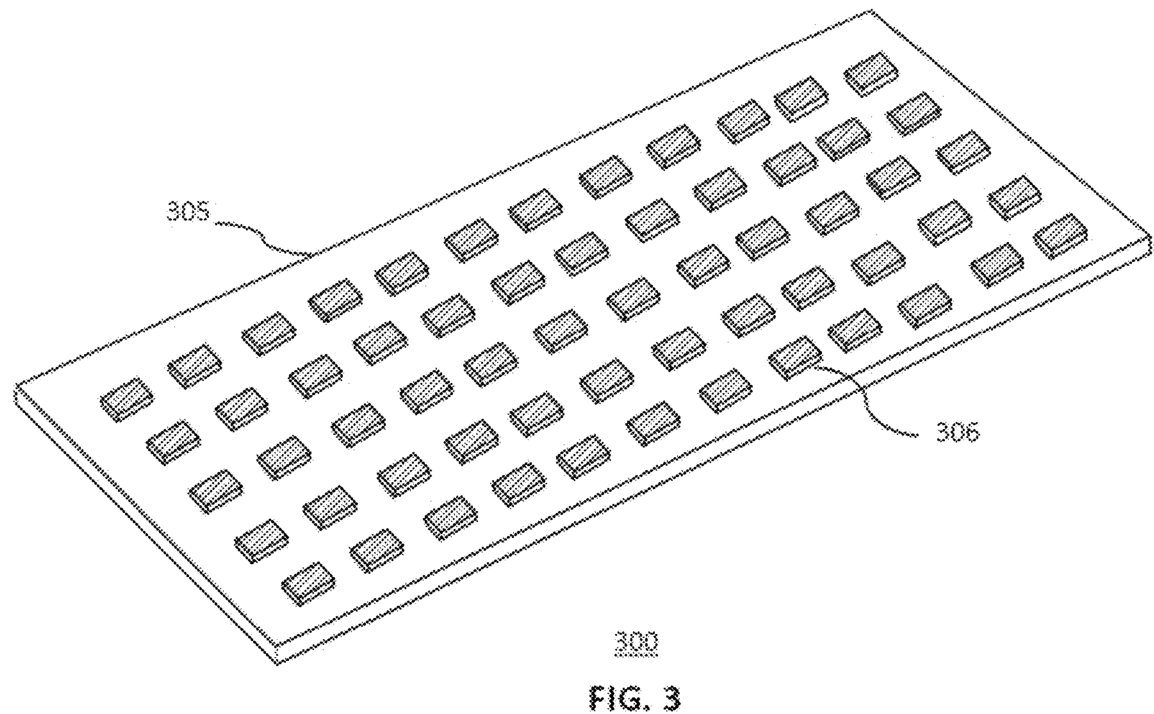
FIG. 3 shows a schematic, isometric rendering of a flat printed circuit board populated with LEDs.

FIG. 3 shows a schematic, isometric rendering 300 of a flat printed circuit board 305 populated with LEDs 306.

The printed circuit board (PCB) 305 may preferably be an aluminum PCB that may provide both superior electrical insulation and thermal conductivity. The thermal conductivity may be useful in managing any heat generated by the LEDs. Aluminum PCBs are commercially available from companies such as, but not limited to, Millennium Circuits Limited of Harrisburg, PA.

The LEDs may be high efficiency, long lifetime LEDs with their spectral content tuned for the requirements of plant cultivation. Such LEDs are commercially available from companies such as, but not limited to, Cree Lighting of Durham, NC.

The LEDs may, for instance, have a variety of spectral properties and be LEDs such as, but not limited to, red LEDs having a spectral output in a range of 620-660 nm, blue LEDs having a spectral output in a range of 450-470 nm, or some combination thereof.

Figure 4:
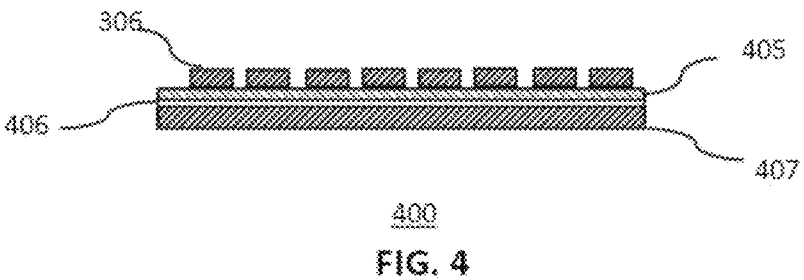
FIG. 4 shows a cross-sectional view of an aluminum printed circuit board populated with light emitting diodes of the present invention.

FIG. 4 shows a cross-sectional view 400 of an aluminum printed circuit board populated with light emitting diodes 306 of the present invention.

The printed circuit board (PCB) may, for instance, consist of several layers. These may include an aluminum substrate 407, a dielectric insulating layer 406 and a copper layer 405 containing the etched electrical circuits.

The aluminum layer may serve as the base or substrate, and may provide structural support as well as acting as a heat sink. The thickness of the aluminum layer typically ranges from 0.5 mm to 3.2 mm, while a range of 1.6 mm to 2.0 mm may provide a good balance of mechanical strength, heat dissipation, and manufacturability.

The dielectric insulating layer 406 may, for instance, be a thin layer of between 50-150 micrometers (μm) thick and may be composed of a dielectric such as, but not limited to, an epoxy resin mixed with ceramic fillers, such as aluminum oxide ($Al_2O_3$) or boron nitride (BN). These fillers may enhance the thermal conductivity of the dielectric while maintaining its insulating properties.

The copper layer 405 may be tailored to balance electrical performance, thermal management, and cost. Its thickness and quality directly influence the PCB's ability to handle current and dissipate heat. It may, for instance, be approximately 70 μm thick to enable a high current-carrying capacity and good heat dissipation.

The LEDs may be surface mount LEDs having high efficiency and long lifetimes with their spectral content tuned for the requirements of plant cultivation.

They may be customized to emit specific wavelengths of light—such as red and blue—that are optimal for photosynthesis, promoting healthy growth and development. Red light may, for instance, encourage flowering and fruiting, while blue light may support vegetative growth like leaves and stems.

In a preferred embodiment, the LEDs may, for instance, have a variety of spectral properties and be LEDs such as, but not limited to, red LEDs having a spectral output in a range of 620-660 nm, blue LEDs having a spectral output in a range of 450-470 nm, or some combination thereof.

Figure 5:
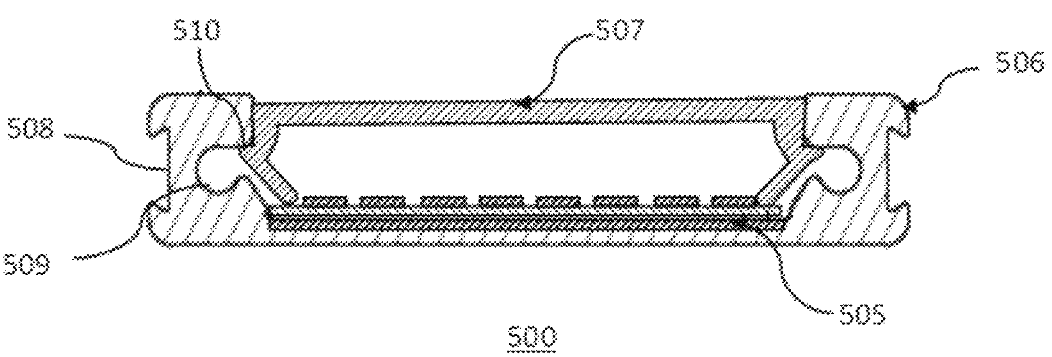
FIG. 5 shows a cross-sectional view of an assembled LED grow light fixture of the present invention.

FIG. 5 shows a cross-sectional view 500 of an assembled LED grow light fixture of the present invention.

The LED grow light fixture may, for instance, be made up of a number of components. These components may be an extruded metallic housing 506, a printed circuit board (PCB) 505 populated with LEDs and a extruded transparent cover 507.

The transparent cover 507 may be an extrusion having a uniform cross-section. The cover may be made of a plastic such as, but not limited to, a polycarbonate, an acrylic or a polyvinyl chloride. In a preferred embodiment, the cover may be extruded polycarbonate because of its exceptional combination of strength, transparency, and heat resistance.

The extruded transparent cover a transparent cover may be shaped to have a planar surface with two side lobes sited at the edge of said planar surface and extending normal to the planar surface.

The extruded metallic housing 506 may, for instance, be made of aluminum and be shaped and sized to accommodate the flat aluminum PCB and to snap fit to the side lobes of the transparent cover.

As shown in FIG. 5, the extruded metallic housing may have side-lobe accommodating recesses 509 that may allow a knee or tab 510 of the transparent cover's side lobe to snap fit to it. By snap fit applicant refers to a method of assembling two components together using interlocking features that "snap" into place. This may be achieved without the need for additional fasteners like screws, bolts, or adhesives. Snap-fit designs rely on the flexibility of the materials involved allowing one part to deform slightly as it's pressed or slid into the other, then return to its original shape to lock securely. The mechanism typically involves features like hooks, tabs, or protrusions on one part that align with corresponding slots, grooves, or recesses on the other.

The extruded metallic housing may also have dove tail indents 508 that may be used to accommodate hanging brackets, i.e., snap-fit brackets that may be used to secure the LED grow light fixtures to ceilings, walls or other parts of a facility in which the LED grow light fixtures may be used.

Figure 6:
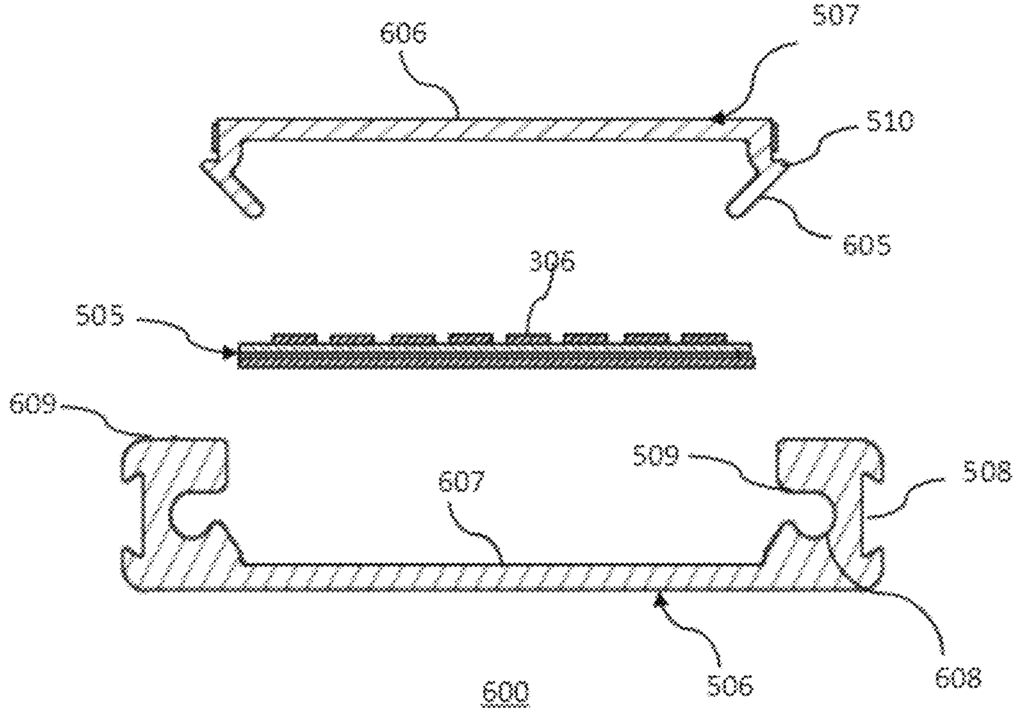
FIG. 6 shows an exploded cross-sectional view of an LED grow light fixture of the present invention.

FIG. 6 shows an exploded cross-sectional view 600 of an LED grow light fixture of the present invention.

Shown in FIG. 6 are an extruded transparent cover 507, a printed circuit board (PCB) 505 populated with LEDs, and an extruded metallic housing 506.

The transparent cover 507 may be an extrusion having a uniform cross-section. The cover may be made of a plastic such as, but not limited to, a polycarbonate, an acrylic or a polyvinyl chloride. The extruded transparent cover may have a planar surface 606 and side-lobes 605 that may be situated at the edges of the planar surface and may extend normal to the planar surface. The side-lobes may have knees or protrusion 510 that may facilitate snap-fitting of the cover to the extruded metallic housing.

The extruded metallic housing 506 may be of uniform cross section and be made of a suitable metal such as, but not limited to, one of the aluminum alloys such as, but not limited to, 6063 aluminum alloy or 6061 aluminum, both of which are alloyed with magnesium and silicon and have good strength, extrudability and corrosion resistance.

The extruded metallic housing may be sized and shaped to accommodate the printed circuit board (PCB) 505 populated with LEDs. This may, for instance, be facilitated by a planar surface 607 and two edge portions 609. The edge portions may have side-lobe accommodating recesses 509 that face inward toward the planar surface. These side-lobe accommodating recesses may be part of thru-channels 608 that may also serve other functions such as, but not limited to, being conduits for cables or wiring. The edge portions may also have outward facing dove tail indents 508 that may be used to accommodate snap-fit hanging brackets that may be used to suspend or hold the LED grow light fixture in place.

Figure 7:
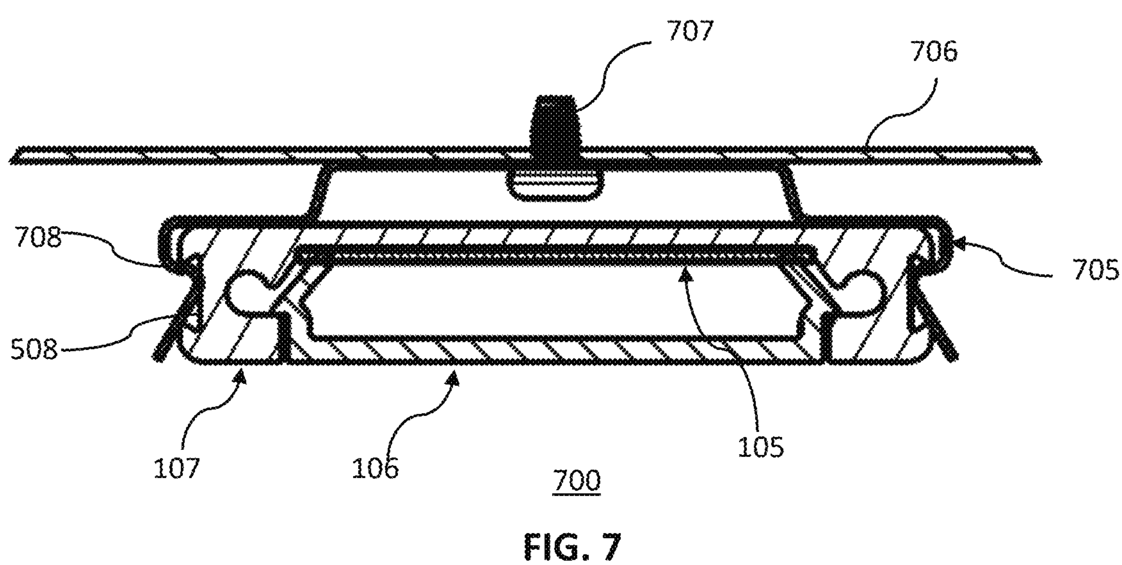
FIG. 7 shows a cross-sectional view of an LED grow light fixture attached to a structural beam by means of a light clamp.

FIG. 7 shows a cross-sectional view 700 of an LED grow light fixture attached to a structural beam 706 by means of a light clamp 705.

As shown in FIG. 7, the LED grow light fixture consisting of the metallic housing 107 containing the flat aluminum PCB 105 populated with at least two LEDs and the transparent cover 106, may be attached to a structural beam 706 by means of a light clamp 705 and a mounting screw 707.

The light clamp, or mounting clip, may, for instance, be made of a metal such as, but not limited to, spring steel. Spring steel is a low-alloy, medium-to-high carbon steel known for its excellent elasticity, resilience, and ability to return to its original shape after deformation.

The light clamp, or mounting clip, may have a shaped, sprung section 708 that may be sized to be push fitted or spring fitted to the dove tail indent 508 of the metallic housing 107.

Figure 8:
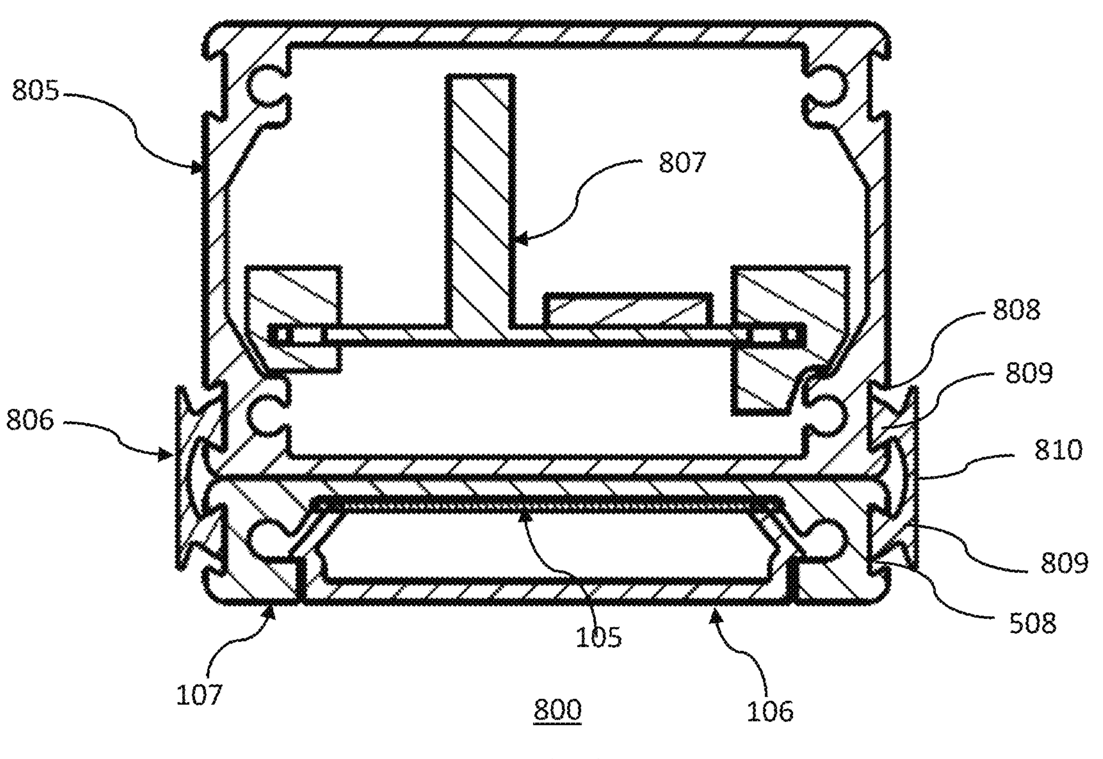
FIG. 8 shows a cross-sectional view of a local power module attached to an LED grow light fixture by means of a power clamp.

FIG. 8 shows a cross-sectional view 800 of a local power module 805 attached to an LED grow light fixture by means of a power clamp 806.

As shown in FIG. 8, a local power module 805 containing an internal electronics module 807, may be attached to a LED grow light fixture made up of a metallic housing 107 containing a flat aluminum PCB 105 populated with at least two LEDs and a transparent cover 106, by means of a power clamp 806.

The power clamp may, for instance, be made up of two tail elements 809, one of which may fit into a dove tail indent or pin 808 on the external surface of the local power module 805, while the other may fit into a dove tail indent 508 on the metallic housing 107. The two tail elements may be linked together by a spring-loaded joining element 810. In this way, the power clamp 806 may be a push or spring fit to the two dove tail indents, thereby removably fixing the local power module 805 to the metallic housing 107 of the lighting fixture.

The power clamp may, for instance, be made of a suitable material such as, but not limited to, spring steel or nylon.

Figure 9:
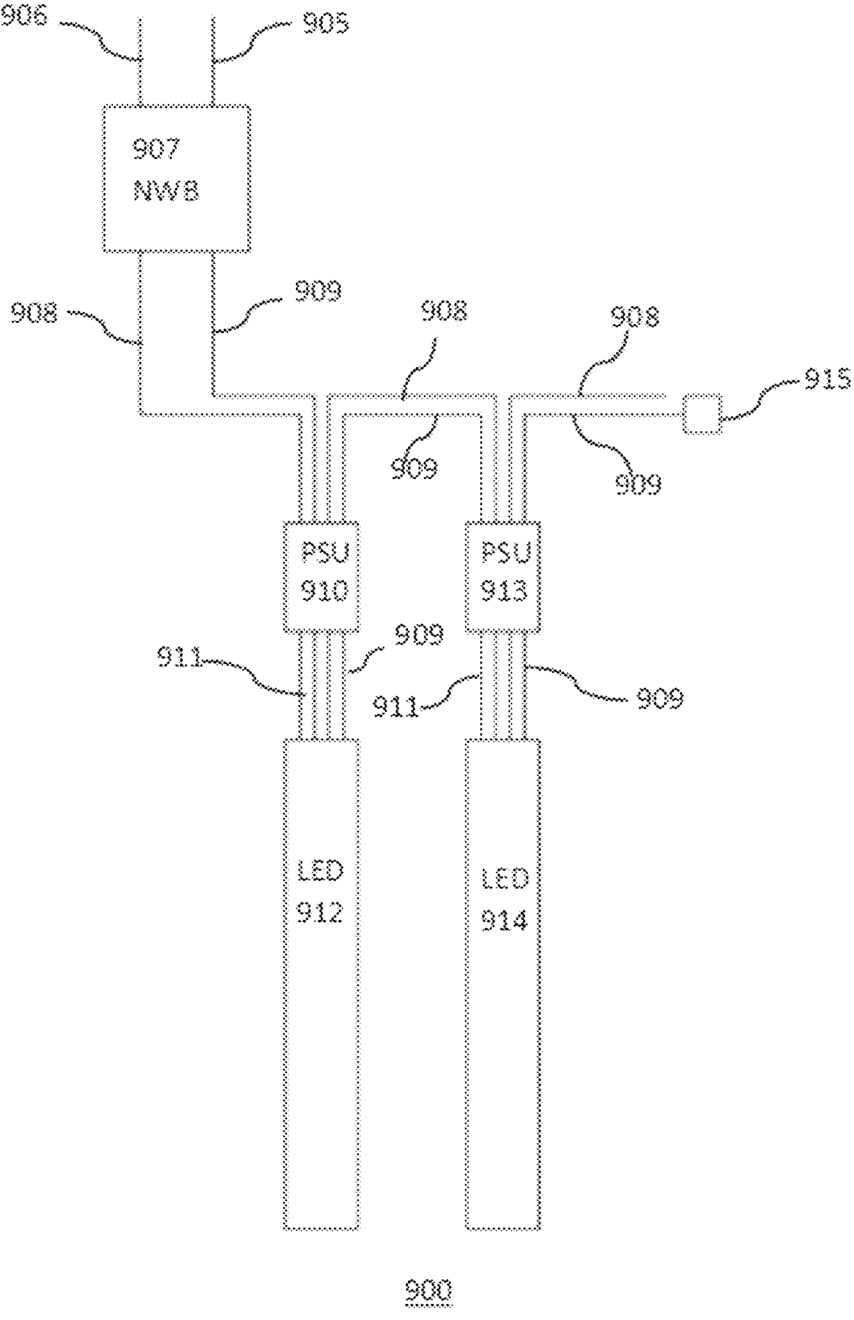
FIG. 9 shows a schematic drawing of representative power and information connections for an embodiment having distributed power units.

FIG. 9 shows a schematic drawing 900 of representative power and information connections for an embodiment having distributed power units.

As shown in FIG. 9, a network box 907 may have as inputs, a connection 906 to a source of alternating electrical power and a connection 905 to an information processing network. The network box may then be connected a first local power supply unit 910 by an alternating current electrical power line 908 and a two-line differential signal 909 communications channel.

The two-line differential signal is a method of transmitting data over a pair of wires where the signal may be represented by the voltage difference between the two lines, rather than by a single voltage referenced to ground. This technique may improve noise immunity and signal reliability by allowing the receiver to detect the difference between the two lines, effectively canceling out common-mode noise or interference that may affect both lines equally. Such an arrangement may be used to support communication protocols such as, but not limited to, the Electronic Industries Alliance (EIA)'s RS-485 standard or a Controller Area Network (CAN) bus.

The first local power supply unit 910 may then convert the incoming AC power to a direct current suitable for powering the LED's in the LED grow light fixture. This DC power may, for instance, be supplied to the array of light emitting diodes (LEDs) 912 by means of a direct current electrical power line 911. The local power supply unit may also link to the LED board by a two-line differential signal 909 in order to control the circuit boards on which the LED's may be mounted.

The first local power supply unit 910 may also relay AC power to a second local power supply unit 913 by means of an alternating current electrical power line 908. There may also be a two-line differential signal communications channel 909 linking the first and second local power supplies.

The second local power supply unit 913 may convert the AC power to DC power and supply it to a second LED array 914 on a second LED grow light fixture. The second local power supply unit 913 may also communicate with the LED circuit board using a two-line differential signal communications channel 909.

The second local power supply unit 913 may also relay AC power on making it available by means of an alternating current electrical power line 908. The second local power supply unit 913 may also link the two-line differential signal communications channel 909 to an end terminal 915. The end terminal is typically a 120-ohm resistor, and may be necessary to avoid signals being reflected back along the communications channel.

The AC power may be supplied at any suitable voltage from 100V to 240V at any suitable frequency from 50 to 60 Hz. The AC power may be converted to a DC voltage that may depend on the length of the LED array. For instance, 48V may be suitable for an LED grow light fixture that may be 2.4 or 3.6 meter in length, while 24V may be suitable for a 1.2 meter length LED grow light fixture.

Figure 10:
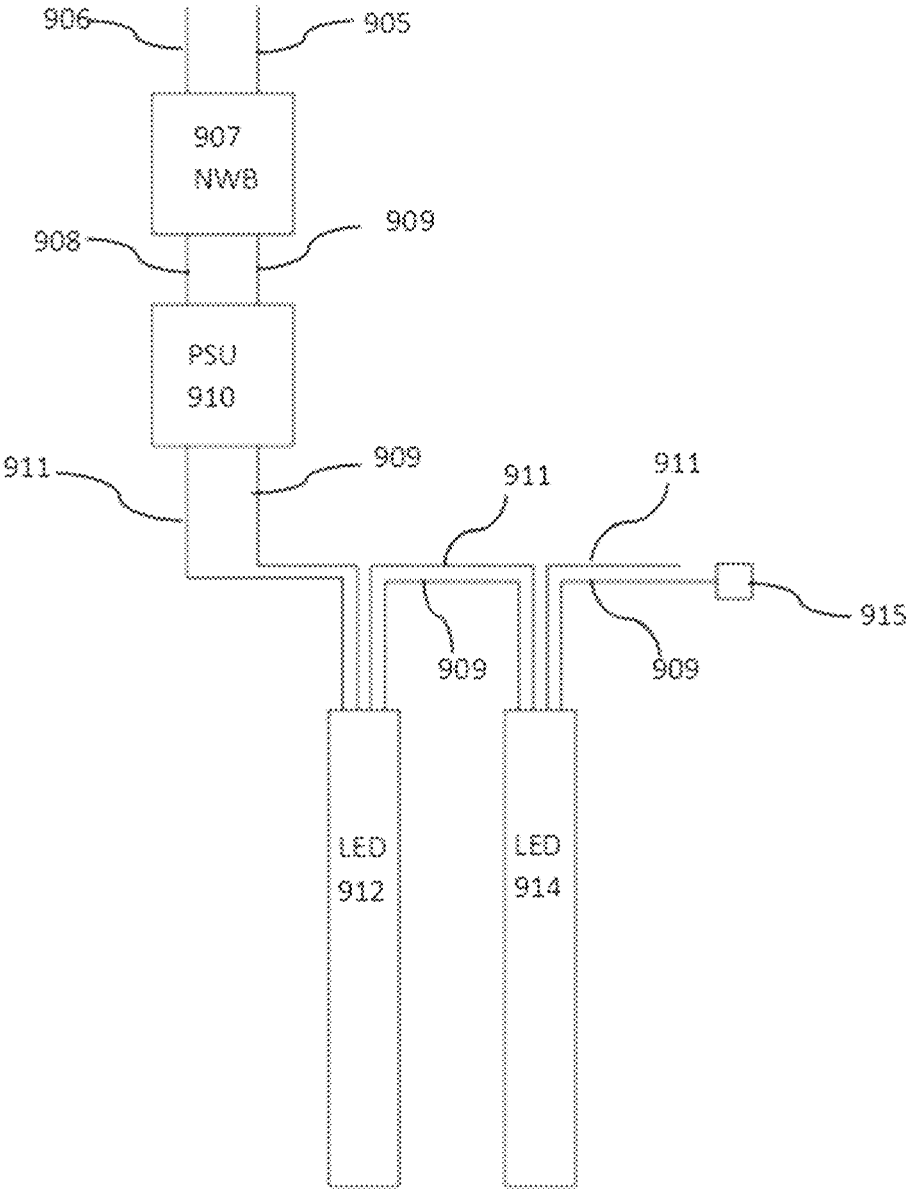
FIG. 10 shows a schematic drawing of representative power and information connections for an embodiment having centralized power units

FIG. 10 shows a schematic drawing 1000 of representative power and information connections for an embodiment having centralized power units As shown in FIG. 10, a network box 907 may receive AC power via a connection 906 to a source of alternating electrical power. The network box may also be connected via a suitable connection 905 to an information processing network. This connection may either be a wired connection of a wireless connection.

The network box 907 may connect to a local power supply unit 910 via an alternating current electrical power line 908 and a two-line differential signal communications channel 909.

The network box may convert the AC power to DC power and supply that to a first array of light emitting diodes (LEDs) 912 on a circuit board on and LED grow light fixture via a direct current electrical power line 911. The network box may also convey commands and instructions to a circuit board on the LED grow light fixture via a two-line differential signal communications channel 909.

The DC power and commands and instructions may then be conveyed to a second array of light emitting diodes (LEDs) 914 on a second LED grow light fixture by beans of a direct current electrical power line 911 and a two-line differential signal communications channel 909 respectively. This process may be repeated for a number of LED grow light fixtures, with the two-line differential signal communications channel 909 finally being ended with a end terminal 915.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed:

1. An air-cooled LED grow light fixture, comprising:
- a flat aluminum printed circuit board (PCB) populated with at least two LEDs;
- a transparent cover comprising a planar surface with two side lobes situated at the edge of said planar surface and extending normal to said planar surface; and
- a metallic housing shaped and sized to accommodate said flat aluminum PCB, and to snap fit to said side lobes of said transparent cover, and having a thin back layer forming an air-cooled heat dissipating element.

2. The light fixture of claim 1 wherein said transparent cover is an extrusion having a uniform cross-section.

3. The light fixture of claim 2 wherein said metallic housing is an extrusion having a uniform cross-section.

4. The light fixture of claim 3 wherein said metallic housing is comprised of aluminum.

5. The light fixture of claim 3 wherein said two or more LEDs comprise at least one red LED having a spectral output in a range of 620-660 nm and at least one blue LED having a spectral output in a range of 450-470 nm.

6. The light fixture of claim 5 further comprising a local power supply.

7. The light fixture of claim 6 wherein said power supply further comprises a network connection enabling independent, remote control of said LEDs.

8. The light fixture of claim 7 wherein said network connection is a two-line differential signal communications channel.

9. A method of using LEDs as an air-cooled grow light, comprising:
- providing a flat aluminum printed circuit board (PCB) populated with at least two LEDs;
- providing a transparent cover comprising a planar surface with two side lobes sited at the edge of said planar surface and extending normal to said planar surface;
- providing a metallic housing shaped and sized to accommodate said flat aluminum PCB, and to snap fit to said side lobes of said transparent cover, and having a thin back layer forming an air-cooled heat dissipating element; and
- powering said LEDs using an electrical current.

10. The method of claim 9 wherein said transparent cover is an extrusion having a uniform cross-section.

11. The method of claim 10 wherein said metallic housing is an extrusion having a uniform cross-section.

12. The method of claim 11 wherein said metallic housing is comprised of aluminum.

13. The method of claim 11 wherein said two or more LEDs comprise at least one red LED having a spectral output in a range of 620-660 nm and at least one blue LED having a spectral output in a range of 450-470 nm.

14. The method of claim 13 further comprising a local power supply.

15. The method of claim 14 wherein said power supply further comprises a network connection enabling independent, remote control of said LEDs.

16. The method of claim 15 wherein said network connection is a two-line differential signal communications channel.

* * * * *